No. 776,625. PATENTED DEC. 6, 1904.
E. A. STICKNEY.
AUTOMATIC ADJUSTABLE SPACING RACK.
APPLICATION FILED MAR. 11, 1903.
NO MODEL. 3 SHEETS—SHEET 1.
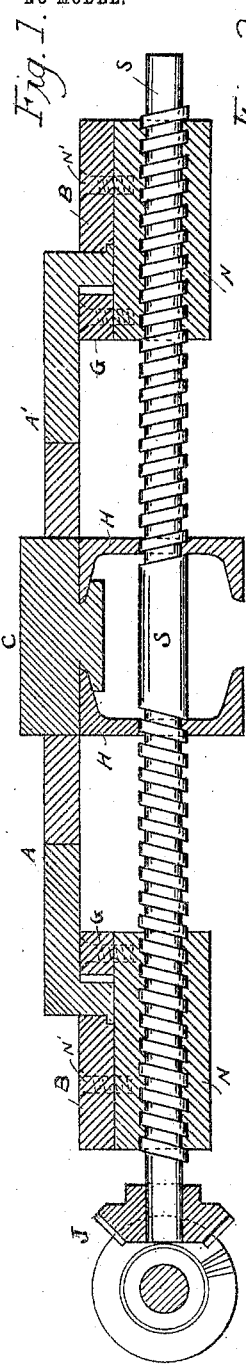
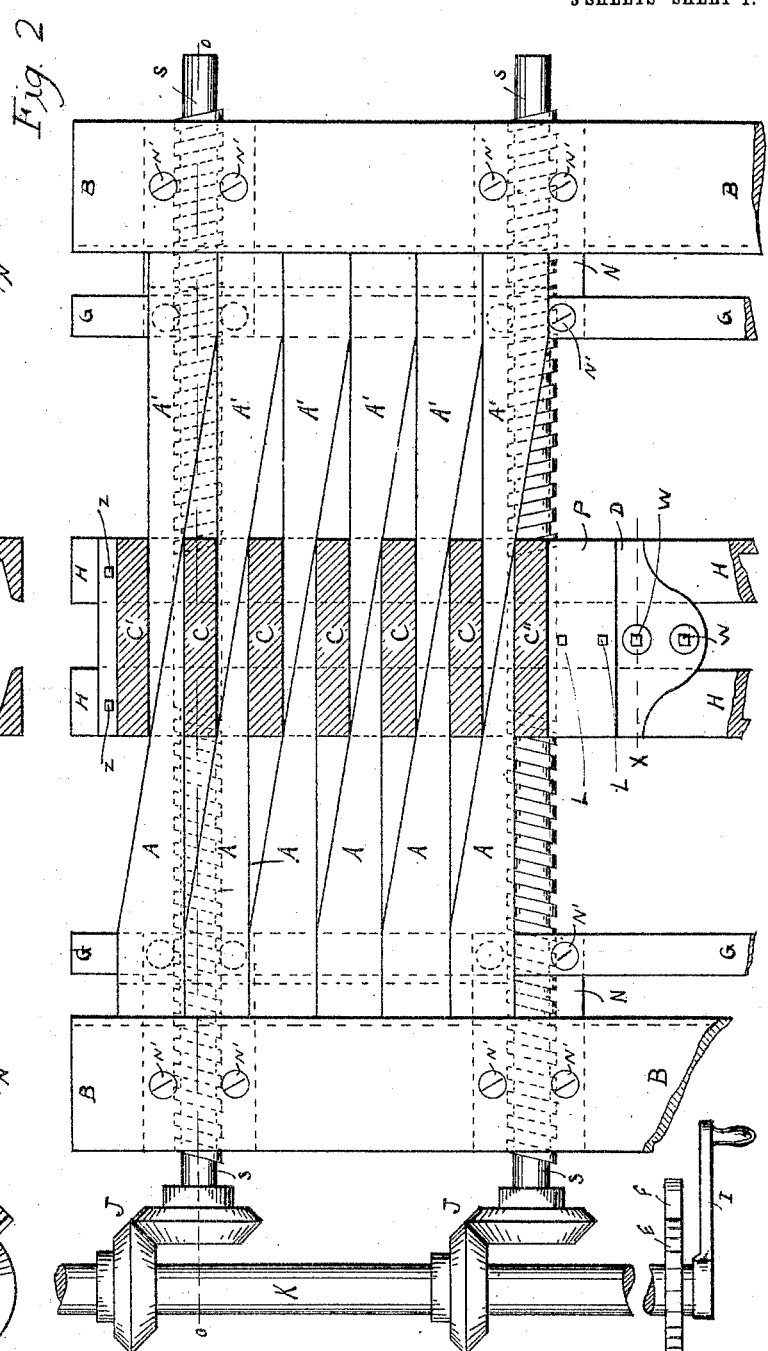
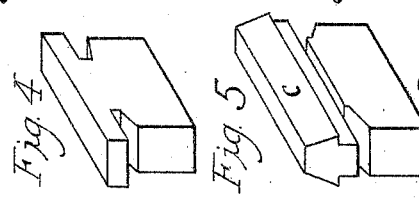
WITNESSES: INVENTOR:
Jos. C. Carpenter E. A. Stickney
M. J. Kinneberg

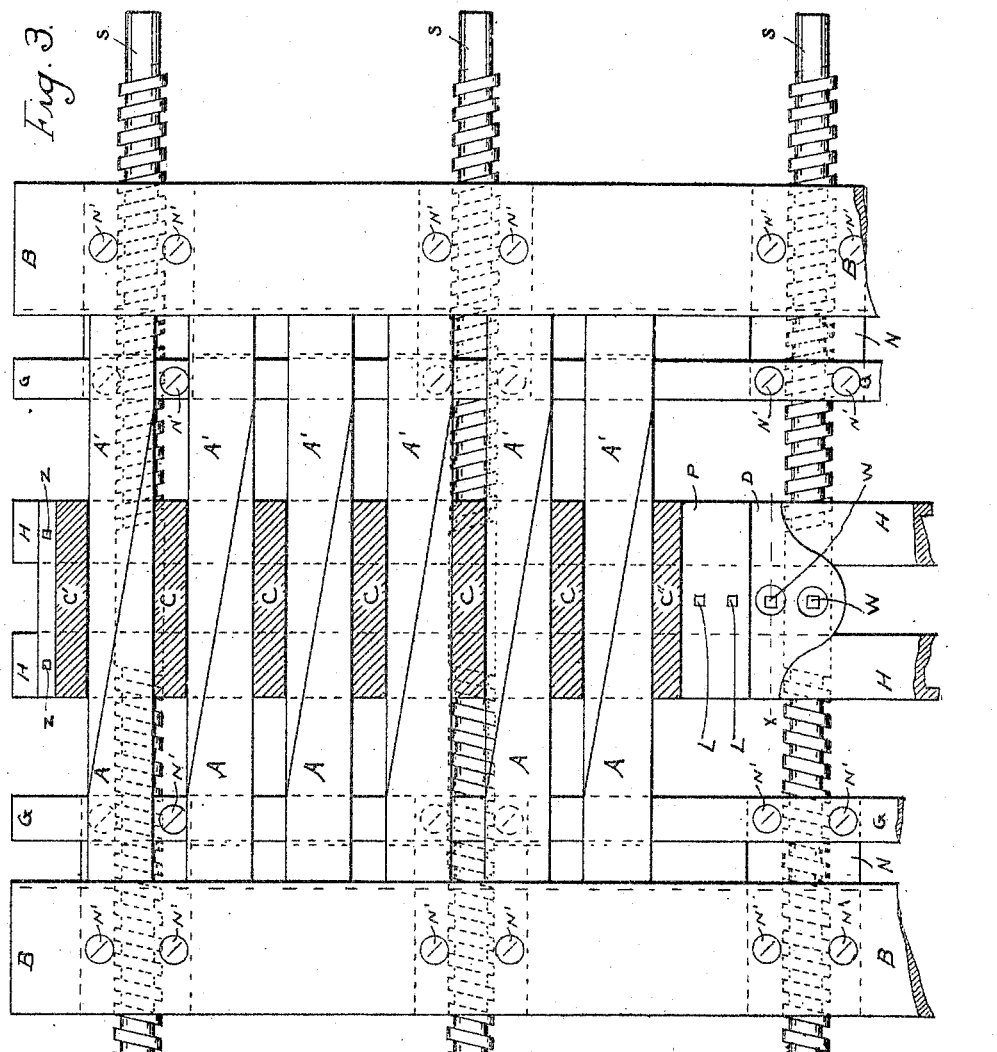
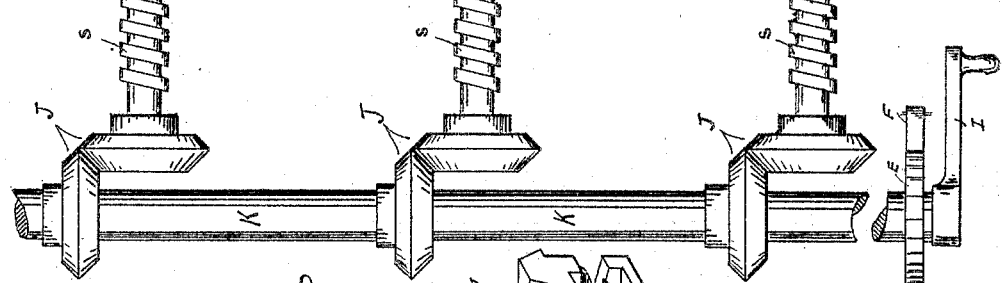
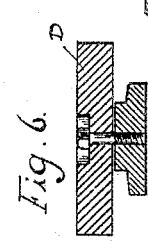
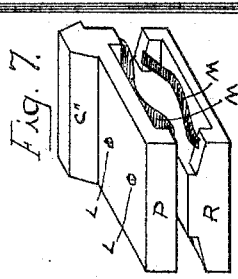

No. 776,625. PATENTED DEC. 6, 1904.
E. A. STICKNEY.
AUTOMATIC ADJUSTABLE SPACING RACK.
APPLICATION FILED MAR. 11, 1903.
NO MODEL. 3 SHEETS—SHEET 3.
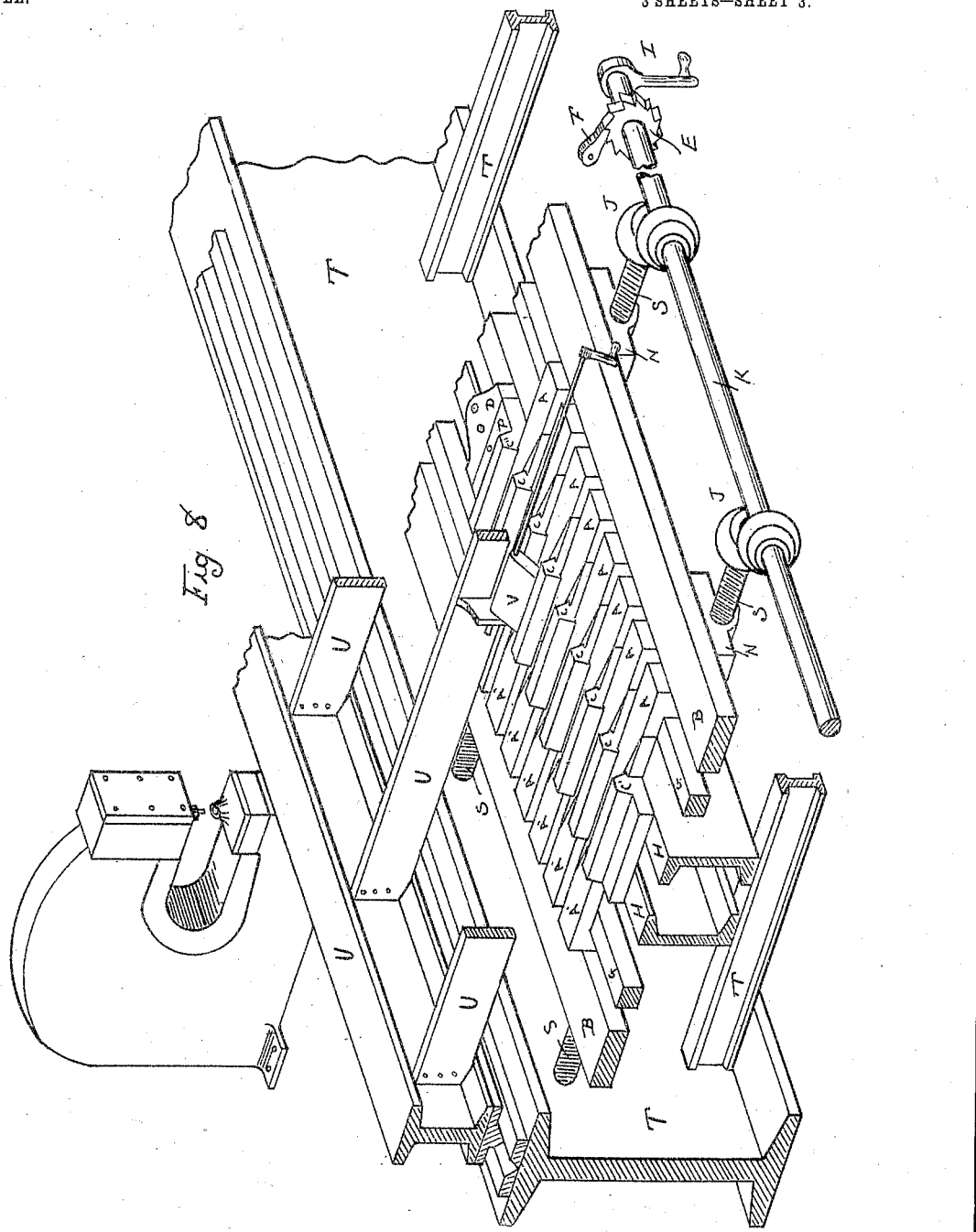
WITNESSES:
E. H. Rogers.
John F. Armstrong
INVENTOR
E. A. Stickney No. 776,625. Patented December 6, 1904.

UNITED STATES PATENT OFFICE.

EDGAR A. STICKNEY, OF SACRAMENTO, CALIFORNIA.

AUTOMATIC ADJUSTABLE SPACING-RACK.

SPECIFICATION forming part of Letters Patent No. 776,625, dated December 6, 1904.

Application filed March 11, 1903. Serial No. 147,307. (No model.)

*To all whom it may concern:*

Be it known that I, EDGAR A. STICKNEY, a citizen of the United States, residing at Sacramento, in the county of Sacramento and State of California, have invented an Automatic Adjustable Spacing-Rack, of which the following is a specification.

My invention relates to certain new and useful improvements in spacing-racks; and the object of my invention is to provide a rack in which the teeth of the same may automatically and accurately be given various pitches uniformly equidistant apart, as may be desired.

My invention when used in connection with a spacing-table is particularly adapted for use in obtaining the proper space for punching, riveting, or impressing a punch or die upon any object carried by the spacing-table.

My invention finally consists in the novel combination and arrangement of parts hereinafter more fully described, and particularly pointed out in the claims.

In describing my invention in detail reference is had to the accompanying drawings, forming part of this specification, wherein like letters of reference indicate corresponding parts throughout the several views thereof, and in which—

Figure 1 is a sectional view through the part indicated by the dotted line *o o* in Fig. 2. Fig. 2 is a top view. Fig. 3 is a top view showing the teeth of the rack at a different pitch. Fig. 4 is a view of the differentiating-block in perspective. Fig. 5 is a view of one of the rack-teeth in perspective. Fig. 6 is a sectional view of D at the point indicated by the dotted line at *x* in Fig. 2. Fig. 7 is a view of the leader-guide in perspective, showing the friction-springs, but on one side only. Fig. 8 is a view in perspective of my improved rack, showing it as applied to a spacing-table in connection with a punching-machine.

Referring to the drawings by reference-letters, A and A' are wedges which operate against and between the rack-teeth C' C and the leader-guide P and slide over and upon the channel-beams H. The wedges are provided with a lug and teat integral with the same, the lug forming a bearing for the bars B and G to press upon and the teat preventing the wedges from becoming dislodged. The space between the bars B and G is made a trifle large, so that the wedges A and A" may readily be removed or inserted when pressure is not upon them. They are all the same size and form and of such thickness as is consistent with the mechanical construction. They should be of such thickness, however, as will give broad bearing-surfaces not only upon themselves, but also against the rack-teeth C', C, and C".

C represents the teeth of the rack and are constructed with recesses at their ends which hold them in place by the projecting arms of the channel-beams H. The rack-teeth are constructed also with grooves on each side, in which slide the wedges A and A', and said grooves also prevent the wedges A and A' from becoming dislodged. C' is a tooth held stationary or in a fixed position by the set-screws or clamp-bolts *z z*, and C" is a tooth integral with the leader-guide P. The rack-teeth C are all of the same size and form. The rack-teeth are not shown in full detail in Figs. 2 and 3 for the purpose of more clearly showing the action of the wedges A and A' and illustrating the principle upon which they work. While the tooth C' is stationary, it is also held in adjustable position by the set-screws or clamp-bolts *z z*.

S represents shafts, one end of each being provided with a right-hand screw-thread and the other end with a left-hand screw-thread, substantially as shown, and are placed at short intervals apart consistent with the mechanical construction. They are so journaled at their ends in the frame of the table or other device to which this rack may be attached or at their center between the channel-bars H in such a manner that they cannot move endwise.

N represents nuts with corresponding screw-threads which operate upon the screw-threaded shafts S and carry the bars B and G, to which they are rigidly attached by set-screws or bolts N' or other suitable means.

B and G are bars attached to the nuts N and operate against the lugs integral with the wedges A and A'. The bars B and G may be any desired length, reference being had to the length of the spacing-rack.

H represents channel-beams supporting the rack-teeth C' C, wedges A A', the guide P, and block D. It is not material that the beams H be channel-shaped. Any angle-shaped beams will be suitable so long as they provide an arm or leg for the wedges A A', rack-teeth C, and leader-guide P to move upon, substantially as shown and for the purpose hereinafter specified.

The beams H may be any desired length, reference being had to the length of the spacing-rack.

J represents miter-gears, one part of which is secured to one end of each of the shafts S and the other part to the shaft K.

K is a shaft carrying the miter-gears J, ratchet-wheel E, and crank I. It is suitably journaled in any well-known manner.

E is a ratchet-wheel.

F is a pawl engaging in the ratchet-wheel.

I is a crank or any suitable means for producing rotary motion to the shaft K.

D is a movable stop-block upon the channel-beams H and provided with set-screws or bolts $w$ $w$ to secure it to the channel-beams at such a point on the same as may be desired. The stop-block limits the movement of the wedges A A', rack-teeth C and C''.

P is a leader-guide upon the channel-beams H and is provided with a tooth C'', integral therewith, and with friction-springs M, which press upon the legs or arms of the beams H above and below, as shown in the drawings. (See Fig. 7.)

L represents set-screws or bolts for binding and holding the parts P and R together and for increasing or diminishing the pressure on the friction-springs M.

T T T T represent the frame, in part, of the bed of a spacing-table of any suitable construction.

U U U U represent the frame, in part, of a movable work-table or carriage adapted to suitable guides or ways. Said movable table or carriage carries the material upon which work is to be performed by a punching or riveting machine. The table is moved by hand-power (not shown) by any well-known and suitable means.

V represents a pawl on said movable table engaging in the adjustable rack and against the rack-teeth C. Said pawl drops by its own weight into the spaces between the rack-teeth and is so journaled in its bearings that it will engage in the rack when the table is moved in the opposite direction after having completed its journey in one direction. The shaft or axis upon which the pawl V is attached is carried out and just beyond the frame of the movable table and is provided with a handle by means of which the pawl is reversed for the return movement of the table or for throwing the pawl up out of the rack when adjusting any object upon the work-table.

The operation of my improved rack is as follows: When the wedges A and A' are placed with their inclined sides together in the position as shown in the drawings (see Figs. 2 and 3) and are moved toward the center of the rack, the sides adjacent to the rack-teeth C, C', and C'' remain parallel, and the distance apart of the parallel sides will vary as the wedges A and A' are moved either toward or from the center. A uniform motion to all the wedges A and A' is imparted to them by the simultaneous action of the right and left hand screw-threaded shafts S, carrying the nuts N, to which the bars B and G are rigidly secured. As the crank I is revolved the motion is communicated by the shaft K to all the shafts S simultaneously through the medium of the miter-gears J, thence to the nuts N. The nuts N being held against rotation by the bars B and G, to which they are firmly secured, will travel upon the right and left hand screw-threaded shafts S, thereby moving the bars B and G against the lugs integral with the wedges A and A' and causing the wedges A and A' all to be moved at one and the same time and the same distance either in or out, depending upon the direction in which the shaft K was revolved. The bars B press upon the lugs integral with the wedges A and A' when the shafts S are revolved, so that the nuts N are drawn toward each other. The bars G press upon the opposite side of said lugs and draw the wedges A and A' back into their former position when the shafts S are revolved in the opposite direction. The tooth C' is stationary and rigidly secured to the beams H by suitable set-screws or clamp-bolts $z$ $z$. As the wedges A and A' are moved toward the center the rack-teeth C and leader-guide P are forced apart and moved toward the stop-block D, which has previously been set and secured to the channel-beams H by suitable set-screws or bolts at such a distance from C' as may be desired, reference being had to the work to be performed upon any object carried by the work-table or carriage of a spacing-table to which this rack may be attached. The forcing apart of the rack-teeth C and guide P also causes the wedges A and A' to be moved along and over the channel-beams H and bars G. The object of the friction-springs M in the leader-guide P is to cause a partial resistance to the advance of the wedges A and A' and rack-teeth C, so that the outer ends of A and A', which are supported by the bars G, will not lag behind, but will follow the advance of the teeth C. The resistance of the springs may be increased or diminished by regulating the set-screws L. The employment of the leader-guide P is not absolutely essential to the working of the spacing-rack and may be omitted, in which case one of the rack-teeth will take its place. When the leader-guide is omitted, the differentiating-block, Fig. 4, when it is used will be placed between the stop-block D and the rack-tooth adjacent to said block D. When the space between the rack-tooth C' and the block D has been completely and compactly filled and the shaft K locked by means of the ratchet-wheel E and pawl F, (the object of the ratchet-wheel and pawl being to lock the various parts, so that the jar of the machinery will not cause the several parts to become loosened,) it will be found that the teeth of the rack are uniformly equidistant apart, and when the work-table or carriage of a spacing-table to which the rack may be attached is moved by an operator by means of a hand-wheel or other well-known appliance used to move such tables over this series of uniformly-distributed teeth it may be caused to be stopped at any of the teeth while a hole is being punched, a rivet set, or an impression made upon any object carried by a work-table. In resetting the teeth of the rack for a shorter distance apart after they have once been set, release the pawl from the ratchet-wheel E and turn the crank I in the opposite direction from that employed in setting the rack. This will cause a reverse motion to be given to the various parts and at the same time will draw the wedges A and A' back and away from the center of the rack, loosen the set-screws or bolts securing the guide P and block D, and slide them toward the tooth C'. This will bring the wedges A and A', rack-teeth C, and leader-guide P together again. Then reset the block D at the required distance from the tooth C' and force the wedges A and A' between the rack-teeth, as described in the first instance. The distance between the centers of the two end teeth—that is, the tooth C' and the tooth C'' on the guide P—may be varied or changed by moving the position of the block D to correspond to the distance which it is required that the work-table shall be moved, reference being had to the work to be performed. In cases where it is necessary to provide but a small variation after the rack has once been set—as, for instance, the difference between the circumferences of two cylinders or pipes which telescope—the distance may be changed by inserting a differentiating-block (see Fig. 4) between the block D and guide P, and in this case it will be necessary to provide for the longer distance first, and the shorter distance will then be made by inserting the differentiating-block, as described. This differentiating-block will correspond in thickness to about six and three-fourths times the thickness of material from which cylinders or pipes are to be made or will correspond in thickness to the difference in distance which it is required to provide for. In all cases the number of teeth (which are readily inserted or removed from the rack when pressure is not upon them) must correspond to the number of holes to be punched, rivets to be set, or other impression-work to be done upon any object carried by a spacing work-table or carriage to which this rack may be applied, except that when the distance between the holes to be punched, rivets to be set, or other impression work to be done shall exceed the maximum capacity of the wedges A and A', then there shall be added sufficient number of extra teeth (either the regular teeth C or blank teeth of corresponding thickness) to the rack, so that every third or fourth or fifth, &c., tooth shall correspond to the distance between the holes to be punched, rivets to be set, or other impression-work to be done, and the operator in charge of such spacing table or carriage will cause the table to pass over these extra teeth and stop at the tooth corresponding to the work to be performed.

Fig. 2 represents the teeth of the rack at their least distance apart, and Fig. 3 represents the teeth as having been advanced or forced apart, so that their distance apart is one and one-half times that shown in Fig. 2. It also brings to view another shaft, S. As the wedges A and A' are still farther advanced the distance between the teeth increases until they reach their maximum distance apart, which I prefer to make double their least distance apart.

The spacing-rack may be any desired length, reference being had to the length of the spacing-table or other machine to which it may be attached or for the purpose for which it is intended.

In illustrating my adjustable rack in connection with a spacing-table and punch in Fig. 8 I do not wish it understood that I limit its application to such a combination. It is equally applicable to other machinery where it is necessary to provide equidistant spacing for various purposes.

The many advantages of my improved adjustable rack can be readily understood by those skilled in the art to which my invention appertains when taken in connection with the accompanying drawings.

It will be noted that various changes may be made in the details of construction without departing from the principle or sacrificing any of the advantages of this invention.

Having thus described my improvement, what I claim as my invention, and desire by Letters Patent to secure, is—

1. The combination in a spacing-rack of the character described, of wedges having lugs, with movable rack-teeth having grooves on each side in which slide said wedges, substantially as shown and described.

2. The combination in a spacing-rack of the character described, of movable rack-teeth having recesses on each end and grooves on each side in which slide wedges, with the arms or legs of channel-beams, substantially as set forth.

3. The combination in a spacing-rack of the character described, of movable rack-teeth and wedges, with a leader-guide having a tooth integral therewith and provided with friction-springs, all substantially as shown and described.

4. The combination in a spacing-rack of the character described, of a stationary tooth, wedges, movable rack-teeth and leader-guide, with a stop-block adjustably secured to channel-beams, all substantially as set forth.

5. The combination in a spacing-rack of the character described, of a stationary tooth, wedges and movable rack-teeth, with a stop-block adjustably secured to channel-beams, all substantially as set forth.

6. The combination in a spacing-rack of the character described, of wedges, right and left screw-threaded shafts carrying correspondingly-threaded nuts to which are secured the bars B and G which operate against the wedges, with the shaft K which is rotatively connected with the several shafts S by means of miter-gears, said shaft K being revolved by the crank I and held in adjustable position by the ratchet-wheel E and pawl F, all substantially as set forth and described.

7. The combination in a spacing-rack of the character described, of a stationary tooth, wedges, movable rack-teeth, leader-guide and stop-block, with a differentiating-block placed between said leader-guide and stop-block for the purpose of providing a variation in distance, all substantially as set forth.

8. The combination in a spacing-rack of the character described, of a stationary tooth, wedges, movable rack-teeth and stop-block, with a differentiating-block placed between the stop-block and the rack-tooth adjacent thereto for the purpose of providing a variation in distance, all substantially as set forth.

In witness whereof I have signed my name to this specification in the presence of two subscribing witnesses.

E. A. STICKNEY.

Witnesses:
   E. H. ROGERS,
   JOHN F. ARMSTRONG.